Figure 1:
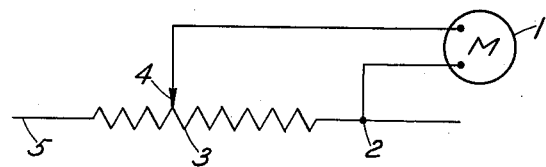

March 11, 1952  G. S. PAWLICKI  2,588,564
THERMOELECTRICALLY BALANCED METER NETWORK
Filed May 26, 1947

INVENTOR.
Gerard S. Pawlicki
BY

Patented Mar. 11, 1952

2,588,564

UNITED STATES PATENT OFFICE 2,588,564

THERMOELECTRICALLY BALANCED METER NETWORK

Gerard S. Pawlicki, Urbana, Ill., assignor to the United States of America as represented by the United States Atomic Energy Commission Application May 26, 1947, Serial No. 750,467

5 Claims. (Cl. 171—95)

My invention relates to electrical networks and more particularly to an arrangement for thermoelectrically balancing sensitive electrical networks.

In the measurement, for example, of the pH concentrations of liquids, particularly those employed in the processing or utilization of radioactive materials, sensitive pH cells and indicators are employed. These instruments and their associated apparatus and circuits are affected in accuracy and operation by local conditions such as moisture, temperature, and the like. It often becomes necessary to insulate portions of the apparatus to protect them against the atmospheric effects. The indicator, such as the voltage responsive "Micro-Max" made by Leeds and Northrop, is not ordinarily fed directly from the pH cell or other equipment, but is shunted by an appropriate resistance, such as a potentiometer, to bypass part of the current and to adjust the potential across the indicating instrument. Since the potentiometer or shunt resistance is wound with a resistance wire of different thermoelectric characteristics than the other wire in the circuit, including the leads to the indicator, and since these leads and connections are at different temperatures, a thermocouple action is set up causing current to flow through the indicator which alters its readings and provides a false indication.

Applicant with a knowledge of these problems in the prior art has for an object of his invention the provision of a resistance network which substantially eliminates the effects of thermocouple action in such arrangements.

Applicant has as another object of his invention the provision of an impedance network wherein the contacts of variable impedances, joining leads or wires of dissimilar metals, are so located as to overcome the effects of thermocouple action.

Applicant has as another object of his invention the provision of a variable resistance network wherein the movable contacts are so located in the circuit that the changes in the ambient temperature of the network will not be adversely effected by thermoelectric or other undesirable currents.

Applicant has as a still further object of his invention the provision of a resistance network for connection into a circuit having conductors or elements of different metals in such a manner as to overcome the adverse effects of thermoelectric currents resulting from the juncture of different metals and changes in the ambient temperature of the system and the connections therein.

Other objects and advantages of my invention will appear from the following specification and accompanying drawings, and the novel features thereof will be particularly pointed out in the annexed claims.

Figure 2:
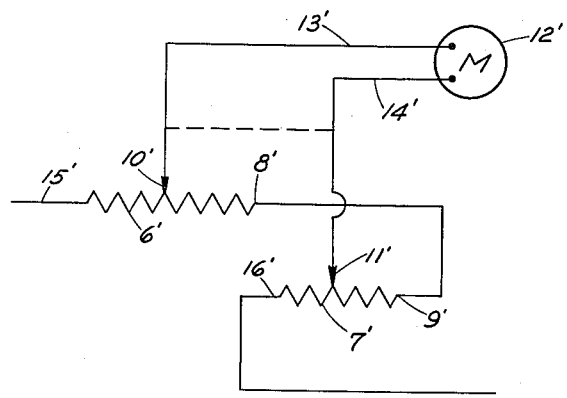

In the drawings, Fig. 1 is a schematic of a conventional arrangement for shunting a sensative electrical measuring instrument. Fig. 2 is a schematic of my improved network and circuit for overcoming the adverse effects of thermoelectric activity in the system.

Referring to the drawings in detail, I designates a sensitive voltage responsive electrical metering instrument such as a "Micro-Max," connected from one juncture 2 of the potentiometer 3 to its moving contact 4. The extremities 2, 5 of the potentiometer are then connected to the pH cell or other source of current to be measured. In this way the potentiometer acts as a shunt to provide a voltage signal to the instrument from a current signal which passes through the potentiometer. The sliding or moving contact 4 will serve to vary the proportionality. However, the potentiometer is ordinarily wound with a resistance wire of different thermoelectric characteristics than the other wire in the circuit and the temperature at the moving contact 4, due to the resistance loss in the potentiometer 3 which is converted into heat, is higher than at the juncture point 2, so that a thermoelectric current is caused to flow through the meter I, resulting in false indication. As the temperature changes, the indicator reading changes, making it difficult to obtain an accurate, firm or constant reading.

In addition to the foregoing action, a rapid change in ambient temperature will cause an undesirable current to flow through the meter since the contact 4 will in general have a different heat capacity than contact 2 due to the difference in masses and, hence, will have a different rate of change of temperature and, therefore, a different temperature during the change, thus altering the relative resistances, as well as creating a temperature difference or altering an existing temperature difference, thereby producing or changing the thermoelectric effect.

In the network of Fig. 2, two potentiometers 6', 7' are preferably mounted on a common shaft (not shown) so that the adjustable contacts move or turn together, and the potentiometers are electrically connected in back-to-back relation so that juncture 8' is connected to juncture 9', placing the two potentiometers in series. Moving contacts 10', 11' are connected to a sensitive electrical measuring instrument 12', such as a "Micro-Max," through leads 13', 14'. The free junctures 15' 16' of potentiometers 6', 7' are then connected to a pH cell or other source of voltage. In this arrangement heat from resistance loss occurs in both potentiometers and leaves the moving contacts 10', 11' at substantially the same temperature so that the thermoelectric currents are negligible. Since these contacts 10', 11' are physically similar, a rapid change in ambient temperature does not produce either such a differential in resistance or in temperature as would result in thermoelectrical effects so as to alter the readings of the instrument or to cause false indications thereof.

In the operation of this resistance network it will be noted that movement of contact 10' towards the juncture 8' of potentiometer 6' results in movement of contact 11' towards juncture 9' of potentiometer 7'. When the two potentiometers reach these junctures, a minimum of voltage drop will appear across the measuring instrument 12' and the current flowing through leads 13' and 14' will be at a minimum. Likewise, movement of the contact 10' towards juncture 15' of potentiometer 6' will result in the movement of contact 11' towards juncture 16' of potentiometer 7'. When these contacts reach the junctures 15', 16' substantially full potential is impressed across the measuring instrument 12' through leads 13', 14'. From this arrangement it is apparent that the contacts 10', 11' are maintained in balanced relation with respect to each other, and for any particular potentiometer setting the temperature and resistance conditions will be maintained substantially the same at both contacts.

Having described my invention, I claim:

1. An electrical network of the character described comprising a circuit including a pair of impedances connected in back-to-back relation, a pair of movable contacts, one of said contacts being carried by each of the impedances, a voltage responsive instrument connected to said contacts, said last connection providing thermoelectrically equivalent points, and means for bridging said circuit across a source of electrical energy.

2. An electrical network of the character described comprising a circuit including a pair of impedances connected in series in back-to-back relation, a pair of adjustable contacts, one of said contacts being carried by each of said impedances for progressively spanning them, a voltage responsive instrument connected across said contacts, means for mechanically coupling said contacts together, said last connection providing thermoelectrically equivalent points, and means for bridging said circuit across a source of electrical energy.

3. An electrical network of the character described comprising a plurality of resistances connected in back-to-back relation, moving contacts carried by said resistances for progressively spanning them, means for moving the contacts of said resistances to maintain equal thermoelectric points during adjustment, a circuit having different thermoelectric characteristics than said resistances coupled across said contacts, and means for applying electrical energy across said resistances.

4. An electrical network of the character described comprising a pair of resistances connected in back-to-back relation, a moving contact carried by each resistance for progressively spanning it, means for ganging the contact of one resistance with that of the other to provide equal thermoelectric points during adjustment, and means for applying electrical energy across the resistances.

5. An electrical network of the character described comprising a pair of resistances connected in series in back-to-back relation, a moving contact carried by each resistance for progressively scanning it, the contact of one resistance being similar to that of the other to maintain equal thermoelectric points during adjustment, means for ganging the contact of one resistance to that of the other, a circuit having different thermoelectric characteristics than said resistances bridged across the moving contacts of said resistances, and means for applying an electrical potential across the resistances.

GERARD S. PAWLICKI.

REFERENCES CITED

The following references are of record in the file of this patent:

UNITED STATES PATENTS

| Number | Name | Date |
|---|---|---|
| 1,824,801 | Bouton | Sept. 29, 1931 |
| 1,982,053 | Hodgson | Nov. 27, 1934 |